(12) United States Patent
Kometani et al.

(10) Patent No.: US 6,288,471 B1
(45) Date of Patent: Sep. 11, 2001

(54) ALTERNATOR HAVING A STARTER WITH NON-UNIFORMLY PITCHED SLOTS

(75) Inventors: Haruyuki Kometani; Yoshihito Asao; Katsumi Adachi, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/493,112

(22) Filed: Jan. 28, 2000

(30) Foreign Application Priority Data

Jan. 28, 1999 (JP) .................................................. 11-020352
Dec. 27, 1999 (JP) .................................................. 11-371290

(51) Int. Cl.⁷ .................................................. H02K 29/00
(52) U.S. Cl. .......................... 310/254; 310/193; 310/216
(58) Field of Search .................................. 310/254, 288, 310/263, 68 D, 179, 216, 193; 29/596–598

(56) References Cited

U.S. PATENT DOCUMENTS

| | | | | |
|---|---|---|---|---|
| 4,458,184 | * | 7/1984 | Kawate | 318/254 |
| 4,644,233 | * | 2/1987 | Suzuki | 318/254 |
| 4,692,646 | * | 9/1987 | Gotou | 310/184 |
| 4,700,098 | * | 10/1987 | Kawashima | 310/186 |
| 4,847,526 | * | 7/1989 | Takehara et al. | 310/185 |
| 5,107,159 | * | 4/1992 | Kordik | 310/156 |
| 5,998,903 | * | 12/1999 | Umeda et al. | 310/179 |

FOREIGN PATENT DOCUMENTS

94/18743 * 1/1994 (WO).

* cited by examiner

Primary Examiner—Tran Nguyen
(74) Attorney, Agent, or Firm—Sughrue, Mion, Zinn, Macpeak & Seas, PLLC

(57) ABSTRACT

An alternator includes a stator having a stator core formed with a number of slots extending longitudinally on an inner circumference thereof, and two sets of three-phase stator coils installed in the slots, and a rotor rotably disposed inside the stator, the rotor having a field coil for generating magnetic flux on passage of electric current, and pole cores covering the field coil, a number of claw-shaped magnetic poles being formed in the pole cores by the magnetic flux, a total number of slots in the alternator being one per pole per phase per set, the slots being formed such that radial center lines of adjacent openings of the slots have nonuniform pitch in a circumferential direction.

12 Claims, 10 Drawing Sheets

FIG. 4

TABLE COMPARING VARIOUS ORDERS OF ROTOR MAGNETOMOTIVE HARMONIC FREQUENCY

| VARIOUS ORDERS | RELATIVE VALUE |
|---|---|
| FIFTH | 100 |
| SEVENTH | 54.5 |
| ELEVENTH | 138.9 |
| THIRTEENTH | 572.5 |

ALTERNATOR HAVING A STARTER WITH NON-UNIFORMLY PITCHED SLOTS

BACKGROUND OF THE INVENTION

1. Field of the Invention

The present invention relates to an alternator in which an alternating voltage is generated in a stator by rotation of a rotor.

2. Description of the Related Art

FIG. 9 is a cross-section of a conventional automotive alternator (hereinafter simply "alternator"), and FIG. 10 is a perspective view of the rotor in FIG. 9, FIG. 11 is a front elevation of the stator core in FIG. 9, and FIG. 12 is an electrical circuit diagram of the alternator in FIG. 9.

The alternator includes: a case composed of an aluminum front bracket 1 and an aluminum rear bracket 2; a shaft 5 rotably disposed in the case having a pulley 4 secured to a first end thereof; a Lundell-type rotor 6 secured to the shaft 5; fans 7 secured to both axial ends of the rotor 6; a stator 8 secured to the inner wall of the case 3; slip rings 9 secured to a second end of the shaft 5 for supplying electric current to the rotor 6; brushes 10 sliding in contact with the slip rings 9; brush holders 11 accommodating the brushes 10; first and second rectifiers 12a and 12b in electrical contact with the stator 8 for converting alternating current generated in the stator 8 into direct current; a heat sink 13 fitted over the brush holder 11; and a regulator 14 fastened to the heat sink 13 by adhesive for adjusting the magnitude of the alternating voltage generated in the stator 8.

The rotor 6 includes a field coil 15 for generating magnetic flux on passage of electric current, and a pole core 16 covering the field coil 15 in which magnetic poles are produced by the magnetic flux. The pole core 16 includes a first pole core assembly 17 and a second pole core assembly 18 which are mutually intermeshed. The first pole core assembly 17 and the second pole core assembly 18 are made of iron and have claw-shaped magnetic poles 19 and 20 at their ends. Spaces 21 are formed between adjacent claw-shaped magnetic poles 19 and 20 in order to prevent magnetic flus from leaking from between the claw-shaped magnetic poles 19 and 20, and also to function as cooling passages for cooling the field coil 15.

The stator 8 includes a stator core 22, and two three-phase stator coils 23a and 23b composed of wire wound onto the stator core with a phase difference of 30 electrical degrees. The stator core 22 shown in FIG. 11 is constructed by punching thin sheets of steel plate into an evenly-spaced comb shape and winding or laminating the comb-shaped plates into a ring shape. Slots 25 and teeth 24 extending in a radial direction are formed on an inner circumferential portion of the stator core 22.

This example has two sets of stator coil, namely the first three-phase stator coil 23a and the second three-phase coil 23b, and the rotor 6 has 12 poles with two three-phase portions corresponding to each pole, and there are therefore seventy-two slots 25 and teeth 24. The stator core 22 is annular, but is shown flattened out in FIG. 13, and the annular stator core 22 is formed with slots 25 at an even pitch of five mechanical degrees (360 degrees/72). Thus, because the seventy-two slots correspond evenly to the twelve poles, the slots 25 are formed at an even pitch of 30 electrical degrees.

The two star-connected three-phase stator coils 23a and 23b are disposed in the slots 25 with a phase difference of 30 electrical degrees from each other, and are electrically connected to the first rectifier 12a and the second rectifier 12b.

In an automotive alternator of the above construction, current is supplied by a battery (not shown) through the brushes 10 and slip rings 9 to the field coil 15, generating magnetic flux, whereby the claw-shaped magnetic poles 19 of the first pole core assembly 17 are polarized with north-seeking (N) poles and the claw-shaped magnetic poles 20 of the second pole core assembly 18 are polarized with south-seeking (S) poles.

At the same time, the pulley 4 is rotated by an engine, and the rotor 6 rotates together with the shaft 5. Consequently, a rotating magnetic field is imparted to the stator coils 23a and 23b and electromotive force is generated. This alternating electromotive force is converted into direct current by means of the rectifiers 12a and 12b, its magnitude is regulated by the regulator 14, and the battery is recharged.

In this automotive alternator, there is one slot 25 in the stator core 22 for each set and phase of the stator coil 23 and for each pole of the rotor 6, and flux leakages formed between adjacent claw-shaped magnetic poles 19 and 20 of the rotor 6 rarely form within the same tooth 24, making flux leakage time in the teeth 24 short. Consequently, decreases in the amount of effective flux acting on the stator coil 23 due to flux leakages are rare and flux surges are reduced.

Moreover, the same technical content as the above automotive alternator is disclosed in Japanese Patent Laid-Open No. HEI 4-26345.

In a conventional automotive alternator, as shown in FIG. 3 which was prepared by the present inventors based on electromagnetic field analysis (A slot opening pitch of 24 degrees, for example, on the horizontal axis means that the electrical angle is at an even pitch of 30 degrees, and the physical angle is at an uneven pitch of 24 to 36 degrees. The vertical axis represents the ratio of harmonic frequencies to the fundamental frequency of the stator magnetomotive force), when the pitch of the slot openings is constant at an electrical angle of 30 degrees, the fifth and seventh spatial harmonic frequencies do not appear in the flux density waveform. However, one problem has been that when the eleventh and thirteenth spatial harmonic frequencies in the magnetomotive harmonic frequencies of the stator 8 are large and the eleventh or thirteenth harmonic frequencies are present in the magnetomotive harmonic frequencies of the rotor 6, suppression of magnetic flux surges is inadequate due to interference between the frequencies, making the suppression of variations in the generated voltage inadequate, and magnetic attraction arises between the claw-shaped magnetic poles 19 and 20 and the claw-shaped magnetic poles 19 and 20 or the rotor 6 vibrate, giving rise to a sound which is unpleasant to passengers in the vehicle.

Similarly, another problem has been that when the slot harmonic frequencies of the stator 8 are the eleventh and thirteenth spatial harmonic frequencies and the eleventh or thirteenth harmonic frequencies are present in the magnetomotive harmonic frequencies of the rotor 6, suppression of magnetic flux surges is inadequate due to interference between the frequencies, making the suppression of variations in the generated voltage inadequate, and magnetic attraction arises between the claw-shaped magnetic poles 19 and 20 or the rotor 6 and the stator 8, making the stator 8, the case 3, etc., resonate, or the claw-shaped magnetic poles 19 and 20 of the rotor 6 vibrate, giving rise to a sound which is unpleasant to passengers in the vehicle.

SUMMARY OF THE INVENTION

The present invention aims to solve the above problems and an object of the present invention is to provide an alternator capable of reducing variations in the generated voltage and reducing noise by enabling the reduction of higher order stator magnetomotive harmonic frequencies and stator slot harmonic frequencies which greatly affect flux surges and magnetic attraction between the stator and the rotor.

To this end, according to the present invention, there is provided an alternator comprising: a stator having a stator core formed with a number of slots extending longitudinally on an inner circumference, and two sets of three-phase stator coils installed in the slots; and a rotor rotably disposed inside the stator, the rotor having a field coil for generating magnetic flux on passage of electric current, and pole cores covering the field coil, a number of claw-shaped magnetic poles being formed in the pole cores by the magnetic flux, a total number of the slots being one per pole per phase per set, the slots being formed such that radial center lines of adjacent openings of the slots have nonuniform pitch in a circumferential direction.

BRIEF DESCRIPTION OF THE DRAWINGS

FIG. 4 is a table comparing various orders of rotor magnetomotive harmonic frequency;

DETAILED DESCRIPTION OF THE PREFERRED EMBODIMENTS

Embodiment 1

Figure 1:
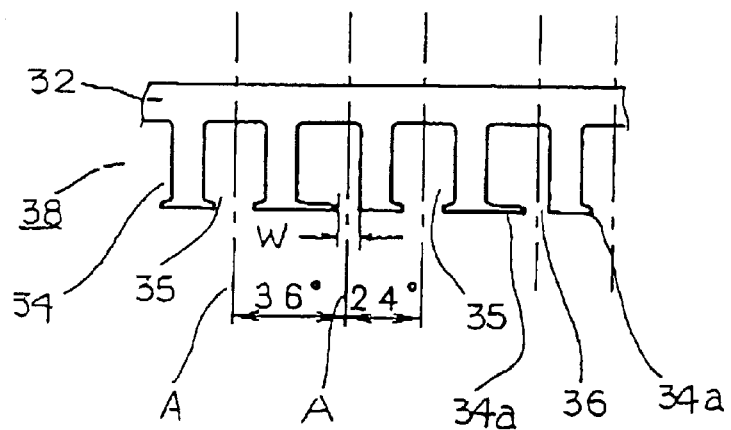
FIG. 1 is a diagram explaining a stator core for an automotive alternator according to Embodiment 1 of the present invention.
Figure 2:
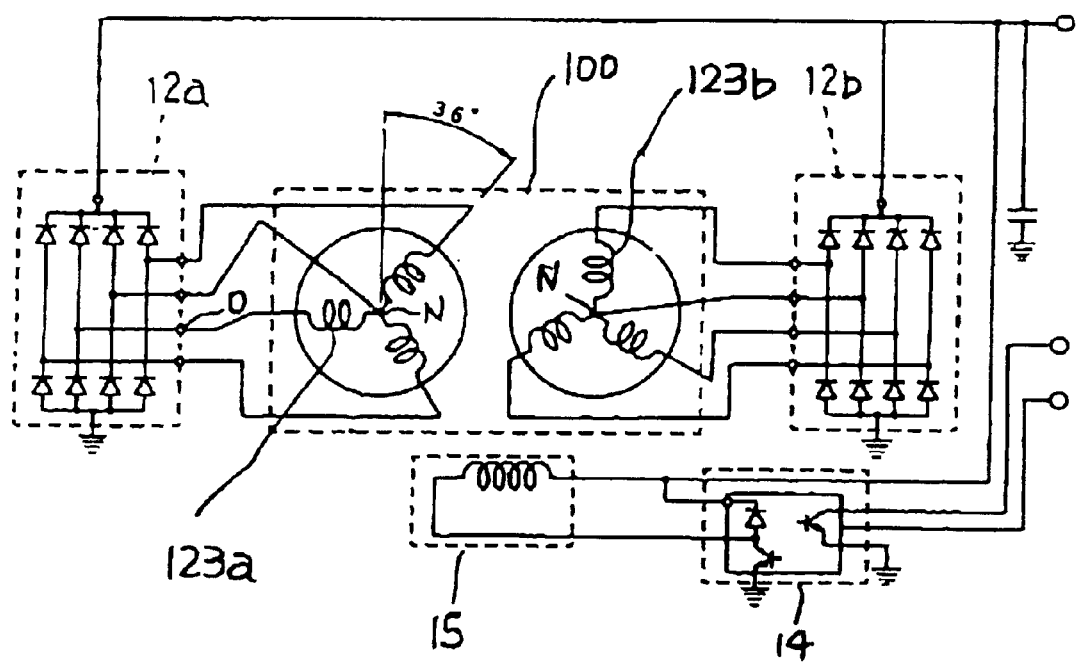
FIG. 2 is an electrical circuit diagram for the automotive alternator in FIG. 1.

FIG. 1 is a diagram explaining a stator core 32 of a stator 100 for an automotive alternator according to Embodiment 1 of the present invention shown flattened out. FIG. 2 is an electrical circuit diagram for the automotive alternator, and portions which are the same as or correspond to portions of the conventional example will be explained using the same numbering.

There is one slot 35 in this stator core 32 per set per phase per pole. In other words, there are seventy-two slots 35, but the pitch between adjacent center lines A of the openings 36 of the slots 35 extending in a radial direction is nonuniform, and thirty-six slots 35 each are formed at electrical angles of 36 and 24 degrees, respectively. The phase difference of the electrical angle between the first three-phase stator coil 123a and the second three-phase coil 123b is 36 degrees instead of the conventional 30 degrees.

The first three-phase stator coil 123a and the second three-phase coil 123b are star-connections, and the rectifiers 12a and 12b which rectify alternating current output are each electrically connected to a star-connected neutral point N.

Furthermore, the first rectifier 12a which rectifies alternating current output from the first three-phase stator coil 123a is electrically connected to the first three-phase stator coil 123a, and the second rectifier 12b which rectifies alternating current output from the second three-phase coil 123b is electrically connected to the second three-phase coil 123b. After rectification, their respective outputs are combined.

Figure 10:
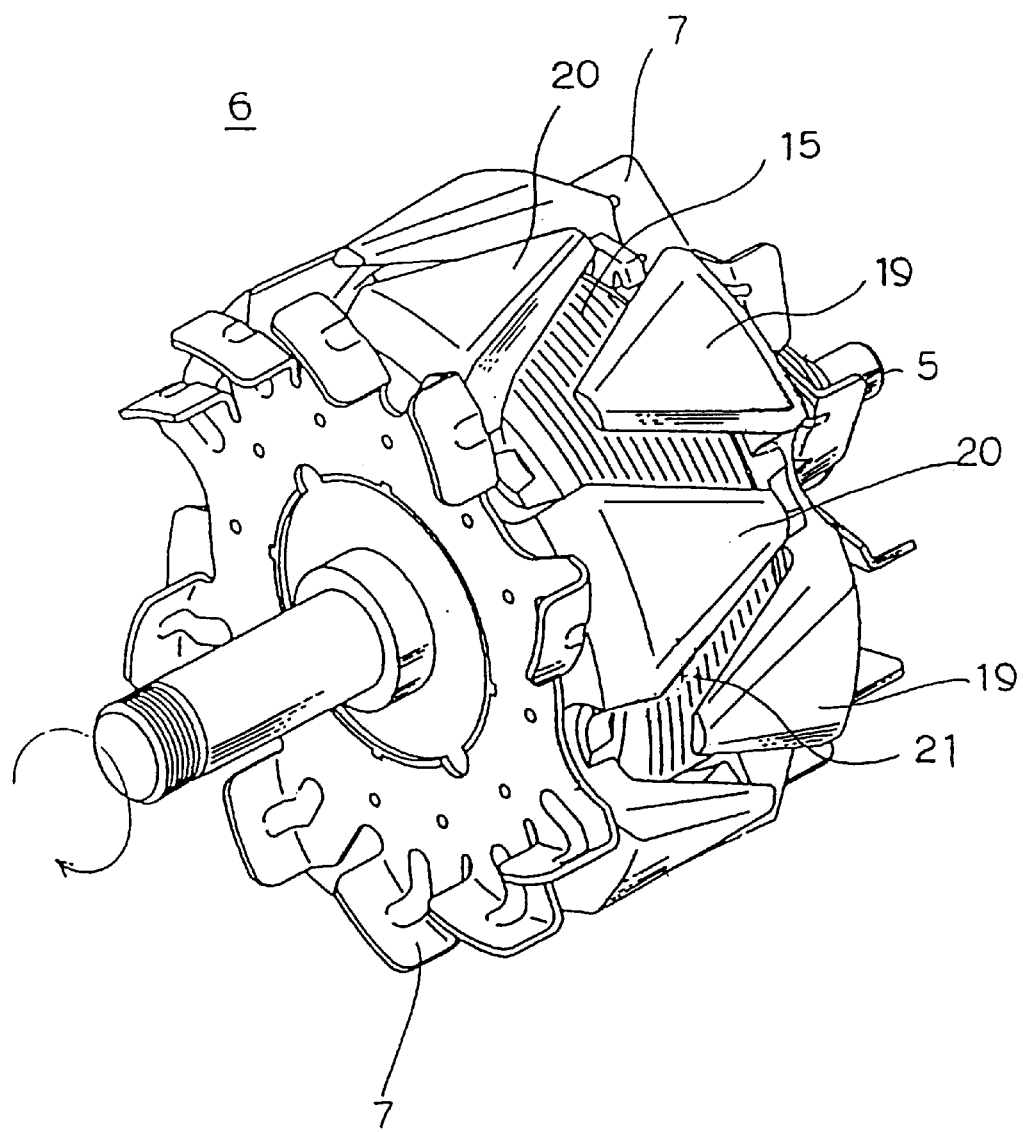
FIG. 10 is a perspective view of the rotor in FIG. 9.
Figure 11:
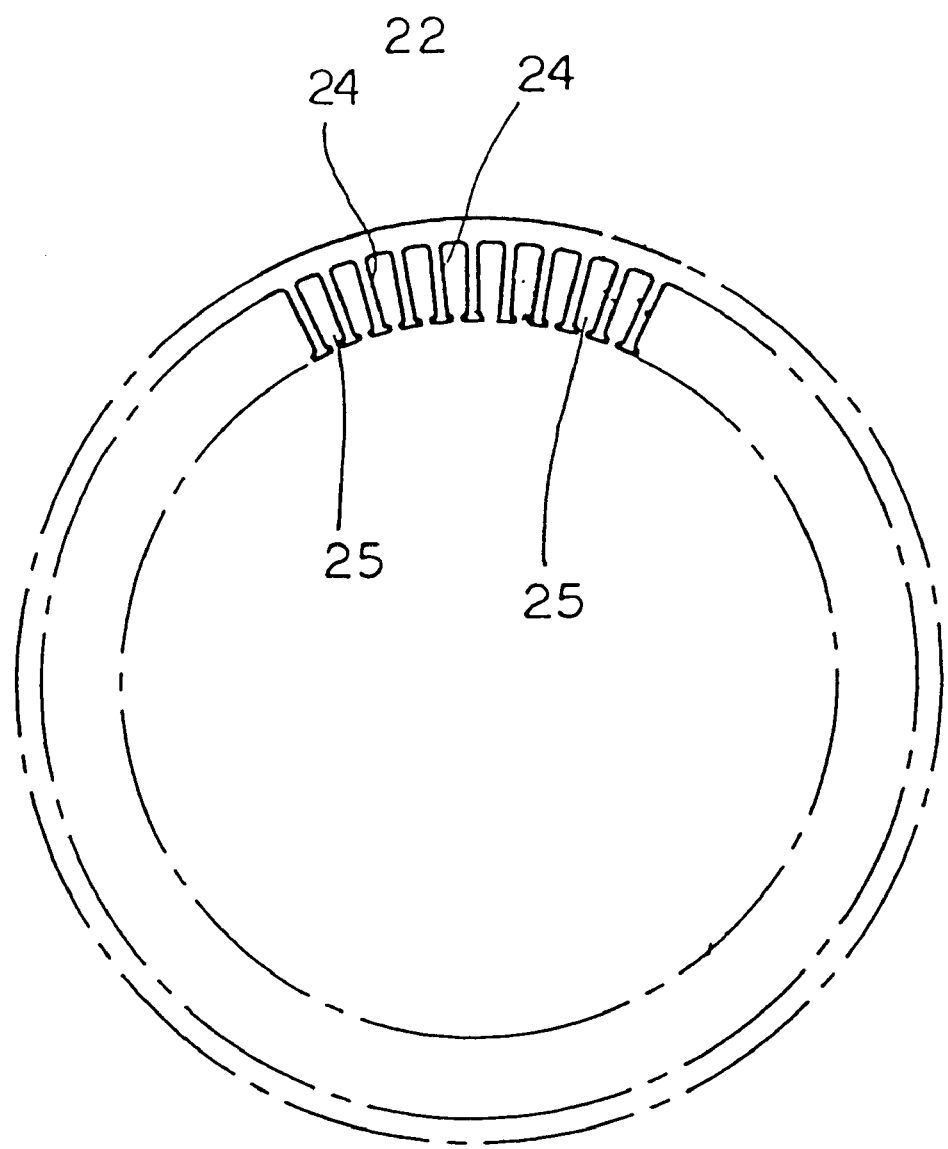
FIG. 11 is a front elevation of the stator core in FIG. 9.
Figure 12:
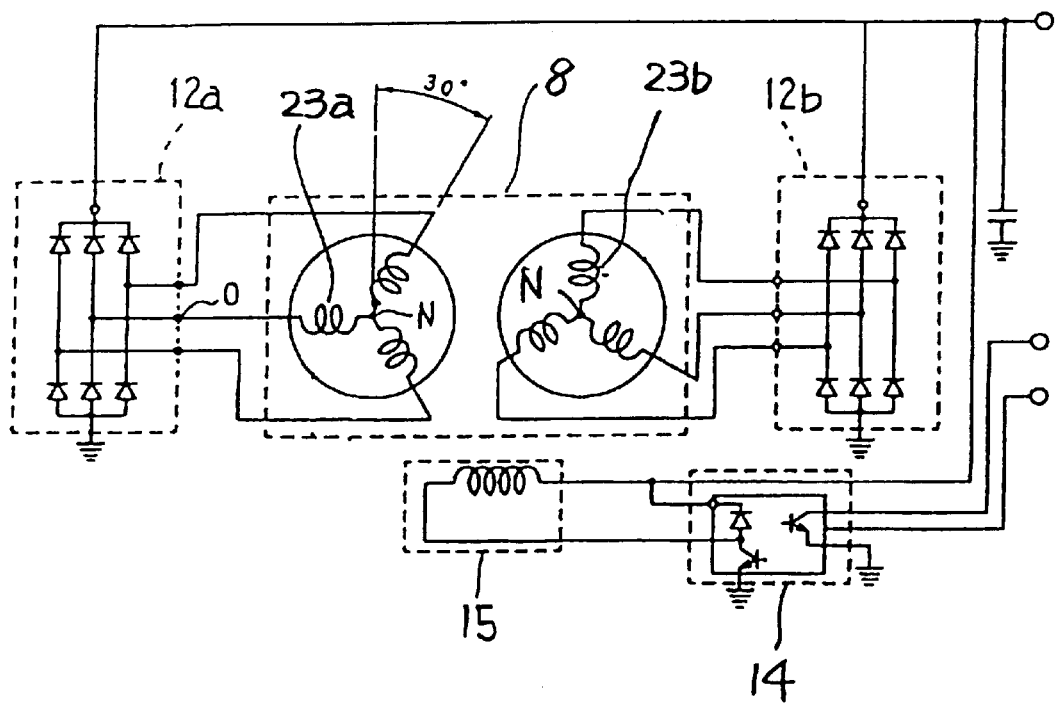
FIG. 12 is an electrical circuit diagram for the automotive alternator in FIG. 9.
Figure 13:
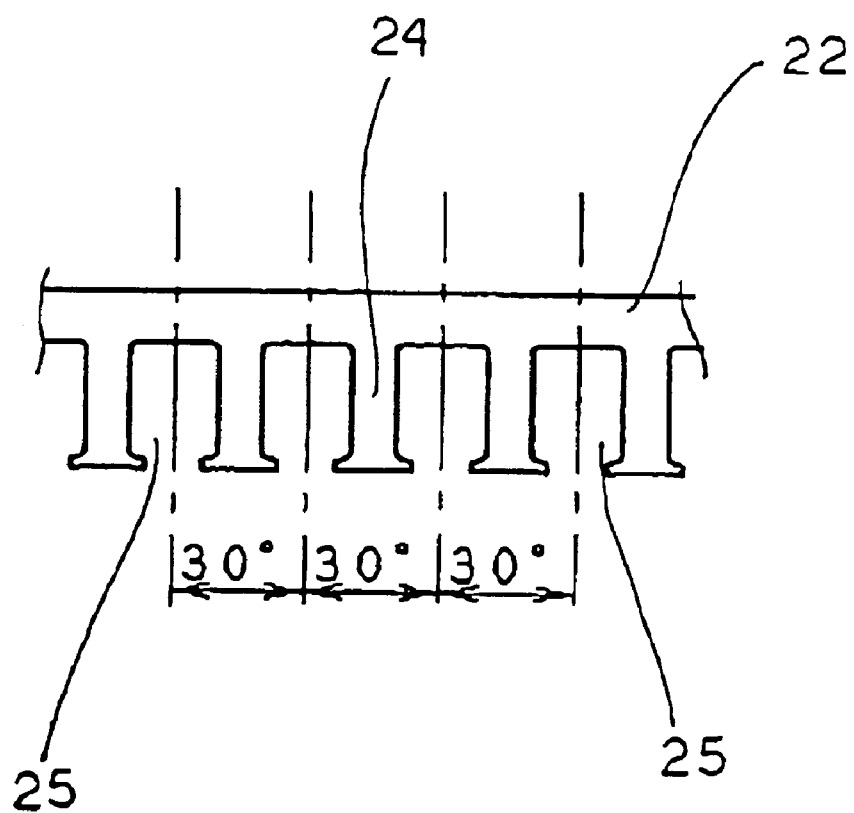
FIG. 13 is a diagram explaining the stator core in FIG. 9.

In this embodiment, the width of the teeth 34 and the width between adjacent teeth are the same as in the stator core 22 shown in FIG. 10, but by adjusting the length of the flanges 34a on the ends of the teeth 34 in a circumferential direction, the dimensions between adjacent center lines A of the openings 36 of the slots 35 extending in the radial direction are made nonuniform.

The flanges 34a do not have to be formed during punching of the sheet metal; they may be formed by shaping the ends if the teeth 34 after the three-phase stator coils 123a and 123b have been installed in the stator core 32. Furthermore, the stator sore 32 may be constructed by winding the sheet metal, or it may be constructed by lamination.

Figure 3:
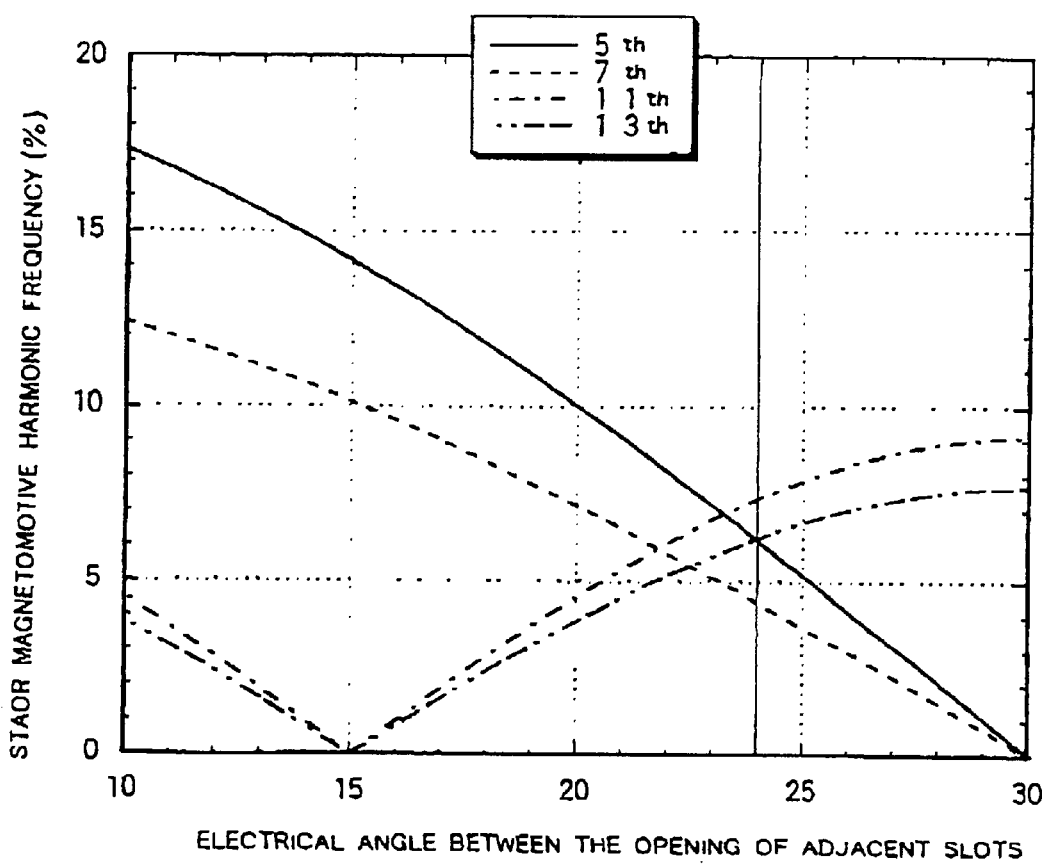
FIG. 3 is a graph showing changes in stator magnetomotive harmonic frequency.

In a stator core 32 for an automotive alternator of the above construction, because the dimensions between the openings 36 of adjacent slots 35 are nonuniform, the thirty-six slots 35 each are formed at electrical angles of 36 and 24 degrees, respectively, as shown in FIG. 3, compared with the conventional case where the electrical angle is 30 degrees, the magnetomotive harmonic frequencies of the stator 38 constituting the flux density waveform are reduced in the eleventh and thirteenth spatial harmonic frequencies, and the fifth and seventh magnetomotive harmonic frequencies of the stator 38 are increased.

Now, the magnetomotive harmonic frequencies of the rotor 6 interfering with the magnetomotive harmonic frequencies of the stator 38 and causing surges in the magnetic flux are represented by the axial integral of the claw-shaped magnetic poles 19 and 20. FIG. 4 is a table of relative values for various orders of magnetomotive harmonic frequency relative to the fifth magnetomotive harmonic frequency of the rotor 6 obtained by the present inventors by analysis of three-dimensional electromagnetic fields. As can be seen from this table, because the poles are claw shaped, the fifth and seventh magnetomotive harmonic frequencies of the rotor 6 are moderated, and are greatly reduced compared to the eleventh and thirteenth magnetomotive harmonic frequencies of the rotor 6.

Consequently, when thirty-six slots 35 each are formed at electrical angles of 36 and 24 degrees, respectively, as shown in Embodiment 1, although the fifth and seventh magnetomotive harmonic frequencies of the stator 38 are increased, the eleventh and thirteenth harmonic frequencies of the stator 38 are reduced. For that reason, surges in the magnetic flux arising due to interference between the eleventh and thirteenth harmonic frequencies of the stator 38 and the eleventh and thirteenth harmonic frequencies of the rotor 6 which contribute the largest share to magnetic flux surges occurring in alternators are reduced, in turn reducing variations in the generated voltage occurring in the alternator.

Furthermore, magnetic attraction between the claw-shaped magnetic poles 19 and 20 of the rotor 6 and the stator 38 is reduced, enabling resonance of the stator 38, the case 3, etc., and vibration of the claw-shaped magnetic poles 19 and 20 of the rotor 6 to be suppressed, thereby enabling noise to be reduced.

Moreover, in the case of Embodiment 1, the eleventh and thirteenth slot harmonic frequencies of the stator 38 are also reduced, thus reducing surges in the magnetic flux arising due to interference between the eleventh and thirteenth slot harmonic frequencies of the stator 38 and the eleventh and thirteenth harmonic frequencies of the rotor 6, enabling further reduction of variations in the generated voltage occurring in the alternator. Furthermore, magnetic attraction between the claw-shaped magnetic poles 19 and 20 of the rotor 6 and the stator 38 is further reduced, enabling resonance of the stator 38 the case 3, etc., and vibration of the claw-shaped magnetic poles 19 and 20 of the rotor 6 to be suppressed, thereby enabling noise to be reduced further.

Figure 5:
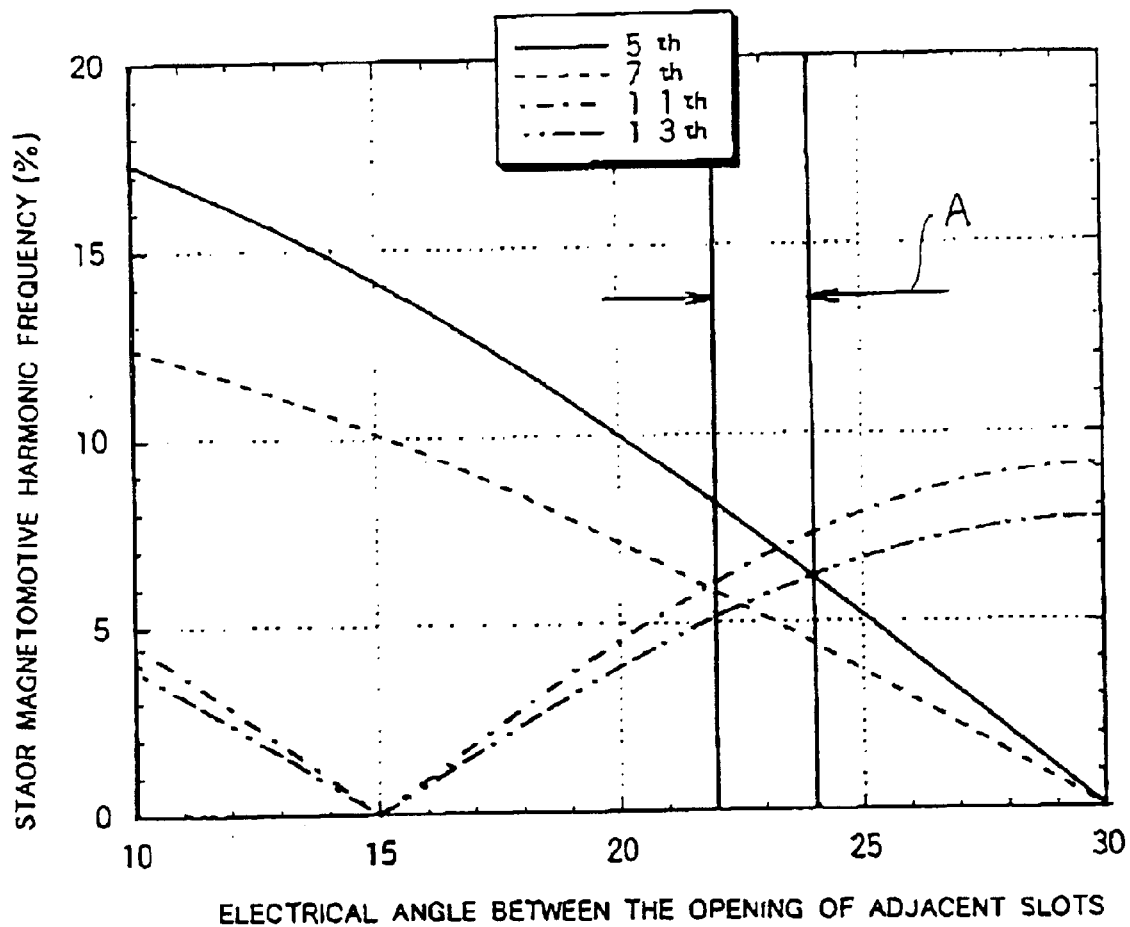
FIG. 5 is a graph showing changes in stator magnetomotive harmonic frequency.

Moreover, the above embodiment was explained using a case where the openings were formed such that the pitch between the center lines alternated between 24 and 36 degrees in the circumferential direction, but naturally the present invention is not limited to those values, and the effects described above can be achieved if the pitch between the center lines of the openings is at an electrical angle within a range of 16 to 29 degrees. The effect is particularly great when the electrical angle is within a range of 22 to 24 degrees, indicated by arrows A in FIG. 5, this being the range where the fifth and seventh magnetomotive harmonic frequencies of the stator intersect the eleventh and thirteenth magnetomotive harmonic frequencies of the stator.

Furthermore, because the neutral points N of the three-phase stator coils 123a and 123b are electrically connected to the rectifiers 12a and 12b, respectively, when the alternator is revolving at high speed, the output can be extracted from the median point voltage, enabling output to be improved.

Because the first rectifier 12a is electrically connected to the first three-phase stator coil 123a, the second rectifier 12b is electrically connected to the second three-phase 123b, and the respective outputs are combined after rectification, the outputs of the stator coils 123a and 123b are stable and do not affect each other. This is particularly effective in cases where the combined output is great and diodes constituting a rectifier would exceed their allowable working temperature if only a single rectifier were used.

Embodiment 2

Figure 6:
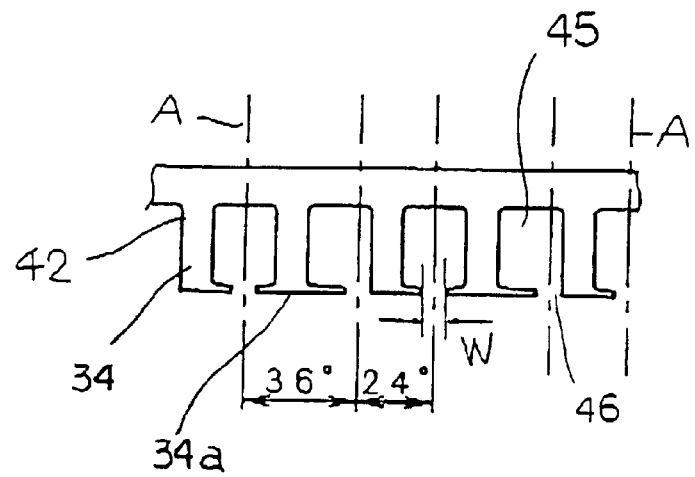
FIG. 6 is a diagram explaining a stator core for an automotive alternator according to Embodiment 2 of the present invention.

FIG. 6 is a diagram explaining a stator core 42 for an automotive alternator according to Embodiment 2 of the present invention, shown flattened out in this diagram.

Whereas in Embodiment 1 the opening width W of the openings 36 of the adjacent slots 35 was nonuniform, Embodiment 2 differs in that the opening width W of the openings 46 of the adjacent slots 45 is uniform the rest of the construction being identical.

Embodiment 3

Figure 7:
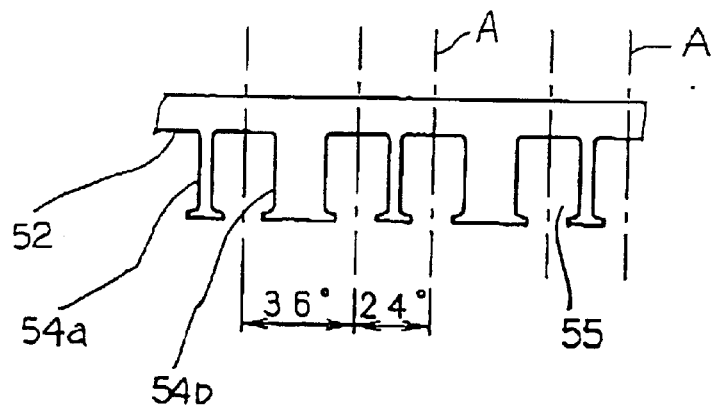
FIG. 7 is a diagram explaining a stator core for an automotive alternator according to Embodiment 3 of the present invention.

FIG. 7 is a diagram explaining a stator core 52 for an automotive alternator according to Embodiment 3 of the present invention, shown flattened out in this diagram.

Embodiment 3 differs from Embodiment 1 in that teeth 54a and 54b separating slots 55 have nonuniform width, the rest of the construction being identical.

In this embodiment, when magnetic flux passing through the small-width teeth 54a increases, magnetic saturation is promoted, but in adjacent large-width teeth 54b, magnetic saturation is instead moderated, and as a result the output of the alternator increases.

Embodiment 4

Figure 8:
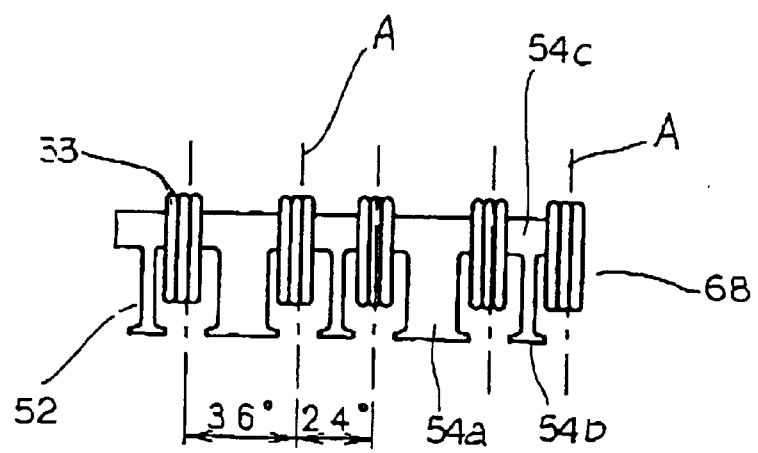
FIG. 8 is a diagram explaining a stator core for an automotive alternator according to Embodiment 4 of the present invention.
Figure 9:
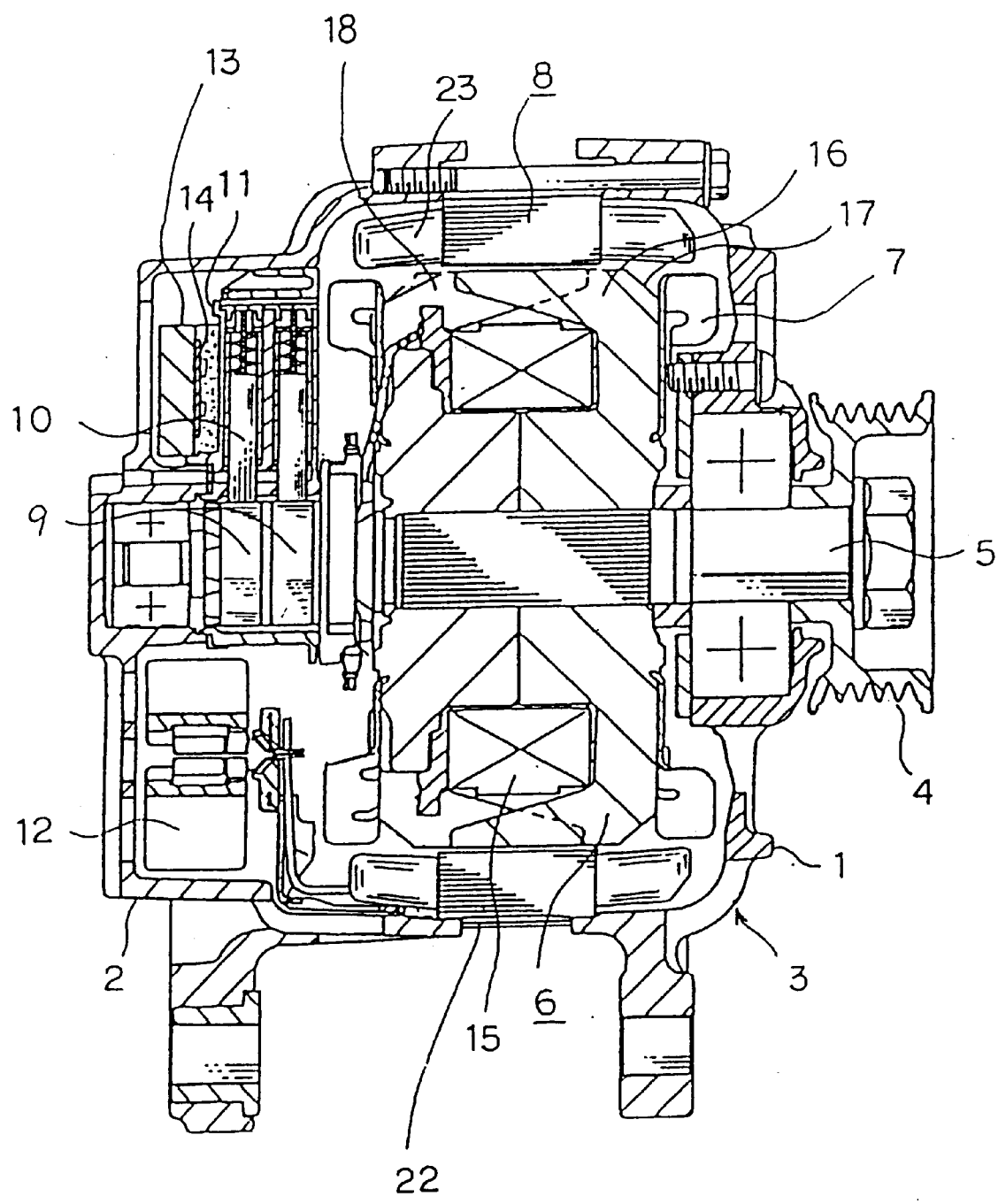
FIG. 9 is a cross-section of a conventional automotive alternator.

FIG. 8 is a diagram explaining a stator 68 for an automotive alternator according to Embodiment 4 of the present invention, shown flattened out in this diagram.

Embodiment 4 differs from Embodiment 3 in that a three-phase stator coil 33 is formed thereon by winding wire onto a bridge 54c between the teeth 54a and 54b, the rest of the construction being identical.

In this embodiment, because a three-phase stator coil 33 is formed by winding wire onto the bridge 54c between the teeth 54a and 54b, the load on the teeth 54a and 54b in the circumferential direction due to the winding of wire is lightened, suppressing deformation of the teeth 54a and 54b and thus being suitable for the stator core 52 which has small-width teeth 54a.

Moreover, each of the above embodiments has been explained with reference to an automotive alternator in which there are a total of seventy-two slots and a total of twelve claw-shaped magnetic poles, but naturally the present invention can also be applied to alternators in which there are a total of ninety-six slots and a total of sixteen claw-shaped magnetic poles or in which there are a total of 120 slots and a total of twenty claw-shaped magnetic poles, for example. Furthermore, in each of the above embodiments, a field coil was encased in a rotor, but the present invention can also be applied to an alternator of a type in which a field coil is secured to a bracket and electric poles are formed by supplying magnetic flux to pole cores of a rotor across an air gap. Furthermore, the present invention is not limited to automotive alternators.

As explained above, an alternator according to one aspect of the present invention, comprises: the slots is formed such that radial center lines of adjacent openings of the slots have nonuniform pitch in a circumferential direction. Therefore, higher order stator magnetomotive harmonic frequencies and stator slot harmonic frequencies which greatly influence magnetic flux surges and magnetic attraction between the stator and the rotor can be reduced, enabling the reduction of variations in the generated voltage and the reduction of noise.

According to one form of the alternator, the pitch between the center lines of the openings may be at an electrical angle within a range of 16 to 29 degrees. Therefore, higher order stator magnetomotive harmonic frequencies and stator slot harmonic frequencies can be reduced, enabling reduction of variations in the generated voltage and reduction of noise.

According to another form of the alternator, the pitch between the center lines of the openings may be at an electrical angle within a range of 22 to 24 degrees being the range where the fifth and seventh magnetomotive harmonic frequencies of the stator intersect the eleventh and thirteenth magnetomotive harmonic frequencies of the stator. Therefore, the eleventh and thirteenth stator magnetomotive harmonic frequencies and stator slot harmonic frequencies in particular can be reduced, enabling more efficient reduction of variations in the generated voltage and reduction of noise.

According to still another form of the alternator, the openings may be formed such that the pitch between the center lines alternates between 24 degrees and 36 degrees in a circumferential direction. Therefore, variations in the generated voltage and noise can be further reduced.

According to another form of the alternator, although there are many slots increasing surges in the teeth and claw-shaped magnetic poles and reducing the rigidity of the stator core, the effects achieved by application of the present invention in reducing variations in the generated voltage and reducing noise are significant.

According to still another form of the alternator, a flange extending in a circumferential direction may be formed on an end portion of a tooth separating the slots; and the pitch between the center lines of the adjacent openings may be adjusted by adjusting a length of the flange in a circumferential direction. Therefore, the pitch between the center lines of adjacent openings can be easily adjusted by adjusting the lengths of the flanges.

According to one form of the alternator, the teeth separating the slots may have nonuniform width. Therefore, when magnetic flux passing through the small-width teeth increases, magnetic saturation is promoted, but in the adjacent large-width teeth, magnetic saturation is instead moderated, and as a result the output of the alternator increases.

According to another form of the alternator, a three-phase stator coil may be formed by winding wire onto a bridge portion between the teeth. Therefore, the load on the teeth on the circumferential direction due to the winding of wire is lightened, suppressing deformation of the teeth.

According to still another form of the alternator, the three-phase stator coil may be a star connection; and a star-connected neutral point of the three-phase stator coil may be electrically connected to a rectifier for rectifying alternating current output. Therefore, when the alternator is revolving at high speed, the output can be extracted from the median point voltage, enabling output to be improved.

According to another form of the alternator, a first rectifier for rectifying alternating current output from a first three-phase stator coil may be electrically connected to the first three-phase stator coil; a second rectifier for rectifying alternating current output from a second three-phase coil may be electrically connected to the second three-phase coil; and the outputs may be combined after rectification. Therefore, the outputs of the stator coils are stable and do not affect each other. This is particularly effective in cases where the combined output is great and diodes constituting a rectifier would exceed their allowable working temperature if only a single rectifier were used.

What is claimed is:

1. An alternator comprising:
    a stator having a stator core formed with a number of slots extending longitudinally on an inner circumference, and two sets of three-phase stator coils installed in said slots; and
    a rotor rotably disposed inside said stator, said rotor having a field coil for generating magnetic flux on passage of electric current, and pole cores covering said field coil, a number of claw-shaped magnetic poles being formed in said pole cores by said magnetic flux,
    a total number of said slots in said alternator being one per pole per phase per set,
    said slots being formed such that radial center lines of adjacent openings of said slots have nonuniform pitch in a circumferential direction.

2. The alternator according to claim 1 wherein said pitch between said center lines of said openings is a at an electrical angle within a range of 16 to 29 degrees.

3. The alternator according to claim 1 wherein said pitch between said center lines of said openings is at an electrical angle within a range of 22 to 24 degrees.

4. The alternator according to claim 1 wherein said openings are formed such that said pitch between said center lines alternates between 24 degrees and 36 degrees in a circumferential direction.

5. The alternator according to claim 1 wherein a total number of said slots is 72 and a total number of said claw-shaped magnetic poles is 12.

6. The alternator according to claim 1 wherein a total number of said slots is 96 and a total number of said claw-shaped magnetic poles is 16.

7. The alternator according to claim 1 wherein a total number of said slots is 120 and a total number of said claw-shaped magnetic poles is 20.

8. The alternator according to claim 1 wherein:
    a flange extending in a circumferential direction is formed on an end portion of a tooth separating said slots; and
    said pitch between said center lines of said adjacent openings is adjusted by adjusting a length of said flange in a circumferential direction.

9. The alternator according to claim 1 wherein said teeth separating said slots have nonuniform width.

10. The alternator according to claim 1 wherein a three-phase stator coil is formed by winding wire onto a bridge portion between said teeth.

11. The alternator according to claim 1 wherein:
    said three-phase stator coil is a star connection; and
    a star-connected neutral point of said three-phase stator coil is electrically connected to a rectifier for rectifying alternating current output.

12. The alternator according to claim 1 wherein:
    a first rectifier for rectifying alternating current output from a first three-phase stator coil is electrically connected to said first three-phase stator coil;
    a second rectifier for rectifying alternating current output from a second three-phase coil is electrically connected to said second three-phase coil; and
    said outputs are combined after rectification.

* * * * *